United States Patent
Oh et al.

(10) Patent No.: US 8,475,659 B2
(45) Date of Patent: Jul. 2, 2013

(54) STRAINERS FOR EMERGENCY CORE COOLING SYSTEMS—ECCS

(75) Inventors: Seung Jong Oh, Daejeon (KR); Sang Yeol Kim, Daejeon (KR); Hyeong Teak Kim, Daejeon (KR); Chang Hyun Kim, Daejeon (KR); Sang Won Lee, Daejeon (KR); Jong In Woo, Gyeongsangnam-do (KR)

(73) Assignees: Korea Hydro & Nuclear Power Co., Ltd., Seoul (KR); BHI Co., Ltd., Gyeongsangnam-do (KR)

( * ) Notice: Subject to any disclaimer, the term of this patent is extended or adjusted under 35 U.S.C. 154(b) by 390 days.

(21) Appl. No.: 12/857,637

(22) Filed: Aug. 17, 2010

(65) Prior Publication Data

US 2011/0297627 A1 Dec. 8, 2011

(30) Foreign Application Priority Data

Jun. 7, 2010 (KR) .............................. 2010-0053351

(51) Int. Cl.
*B01D 35/02* (2006.01)
*B01D 35/28* (2006.01)
*B01D 29/00* (2006.01)

(52) U.S. Cl.
USPC .................. 210/232; 210/167.01; 210/172.3; 210/172.4; 210/499; 210/416.1; 210/489; 210/346; 210/486; 376/282; 376/313

(58) Field of Classification Search
None
See application file for complete search history.

(56) References Cited

U.S. PATENT DOCUMENTS

| | | | | |
|---|---|---|---|---|
| 3,935,105 A * | 1/1976 | McEwen | ....................... | 210/138 |
| 4,225,328 A * | 9/1980 | Stiehl | ............................. | 55/378 |
| 4,376,091 A * | 3/1983 | Netkowicz et al. | ........... | 376/283 |
| 5,035,799 A * | 7/1991 | Rosberg et al. | ............... | 210/232 |
| 5,080,699 A * | 1/1992 | Ho et al. | ......................... | 96/129 |
| 5,345,483 A * | 9/1994 | Johansson et al. | ............ | 376/313 |
| 5,390,221 A * | 2/1995 | Dix et al. | ...................... | 376/352 |
| 5,426,679 A * | 6/1995 | Henriksson | .................... | 376/313 |
| 5,453,180 A * | 9/1995 | Henriksson | .............. | 210/167.01 |
| 5,478,469 A * | 12/1995 | Bryan et al. | ................... | 210/232 |
| 5,483,564 A * | 1/1996 | Matzner et al. | ............... | 376/352 |
| 5,496,468 A * | 3/1996 | Cormier | ..................... | 210/172.3 |
| 5,688,402 A * | 11/1997 | Green et al. | .................... | 210/355 |
| 5,696,801 A * | 12/1997 | Dwyer et al. | ................. | 376/313 |
| 5,759,398 A * | 6/1998 | Kielbowicz | ................ | 210/416.1 |
| 5,759,399 A * | 6/1998 | Bilanin et al. | ............. | 210/416.1 |
| 5,815,544 A * | 9/1998 | Lefter | ........................... | 376/313 |
| 5,835,549 A * | 11/1998 | Sibiga | ............................ | 376/313 |
| 5,843,314 A * | 12/1998 | Dwyer et al. | ................. | 210/315 |
| 5,935,439 A * | 8/1999 | Hart et al. | ................... | 210/416.1 |
| 5,958,234 A * | 9/1999 | Dwyer et al. | ................. | 210/315 |
| 6,477,220 B1 * | 11/2002 | Wivagg | ........................ | 376/282 |

(Continued)

*Primary Examiner* — Robert James Popovics
(74) *Attorney, Agent, or Firm* — Leydig, Voit & Mayer, Ltd.

(57) ABSTRACT

A strainer wall structure that removes foreign substances from a fluid suctioned into a pipe and a re-circulation pump that is part of an emergency core cooling system (ECCS). The strainer wall structure has an inlet side and an outlet side through which cooling water is introduced and discharged, respectively, and includes a body having an opening in a direction of the inlet side, closed side surfaces, and an outlet port disposed at one of the closed side surfaces. The strainer includes a punched plate filter screen inserted into the opening. A modular cassette apparatus including grooved first filter plates is inserted into the body, and second filter plates having second grooves is inserted into the first grooves.

1 Claim, 16 Drawing Sheets

U.S. PATENT DOCUMENTS

| | | | |
|---|---|---|---|
| 6,491,818 B2 * | 12/2002 | Dwyer et al. | 210/315 |
| 7,211,190 B2 * | 5/2007 | Kielbowicz | 210/232 |
| 7,488,426 B1 * | 2/2009 | Zaiter | 210/767 |
| 7,788,867 B2 * | 9/2010 | Oates et al. | 52/302.1 |
| 7,822,164 B1 * | 10/2010 | Kielbowicz | 376/313 |
| 7,848,475 B2 * | 12/2010 | Kaufman et al. | 376/282 |
| 8,048,319 B2 * | 11/2011 | Smith et al. | 210/767 |
| 8,054,932 B2 * | 11/2011 | Smith et al. | 376/282 |
| 2002/0148766 A1 * | 10/2002 | Dwyer et al. | 210/315 |
| 2004/0206679 A1 * | 10/2004 | Bleigh | 210/97 |
| 2005/0167355 A1 * | 8/2005 | Kielbowicz | 210/416.1 |
| 2006/0075697 A1 * | 4/2006 | Oates et al. | 52/177 |
| 2006/0219645 A1 * | 10/2006 | Bilanin et al. | 210/791 |
| 2007/0045166 A1 * | 3/2007 | Fanning et al. | 210/330 |
| 2007/0084782 A1 * | 4/2007 | Smith et al. | 210/323.2 |
| 2008/0223779 A1 * | 9/2008 | Kaufman et al. | 210/416.1 |
| 2009/0184064 A1 * | 7/2009 | Zaiter | 210/767 |
| 2010/0025315 A1 * | 2/2010 | Smith et al. | 210/232 |
| 2011/0215059 A1 * | 9/2011 | Smith et al. | 210/806 |
| 2011/0297627 A1 * | 12/2011 | Oh et al. | 210/806 |
| 2012/0037559 A1 * | 2/2012 | Kim et al. | 210/323.2 |
| 2012/0037572 A1 * | 2/2012 | Kim et al. | 210/767 |
| 2012/0273407 A1 * | 11/2012 | Haque et al. | 210/335 |

* cited by examiner

STRAINERS FOR EMERGENCY CORE COOLING SYSTEMS—ECCS

TECHNICAL FIELD

The present invention relates to a strainer wall structure (referred to as a passive filtration apparatus) for filtering foreign substances, settlings, etc., generated upon occurrence of failures or accidents of an apparatus requiring a water circulation system, and more particularly, to a strainer wall structure used to remove foreign substances from a fluid suctioned into a pipe and a re-circulation pump when the re-circulation pump goes through an operation of an emergency core cooling system (ECCS) when a pipe failure occurs in a nuclear power plant.

BACKGROUND ART

A nuclear reactor of a nuclear power plant is surrounded by a safety vessel formed of concrete and steel, which is referred to as a containment, in which a coolant circulates to maintain a proper temperature. In addition, the nuclear reactor includes an ECCS for cooling the nuclear reactor upon occurrence of failures or accidents.

The ECCS must be operated upon occurrence of accidents such as coolant leakage, etc., to cool the nuclear reactor for 30 days with no external interference. The ECCS is a system for collecting coolant discharged and water sprinkled upon a pipe failure into a sump disposed at the lowermost part in the containment, sprinkling the water from an upper part of the containment using the re-circulation pump to cool the containment, and circulating some of the water through a nuclear reactor cooling system to remove remaining heat of the nuclear reactor using a remaining heat removing pump.

When coolant leakage occurs due to damage to a pipe, etc., in a primary system of the nuclear power plant, foreign substances such as lagging materials, coating materials, latent foreign substances, etc., are generated due to discharge of a coolant. In addition, the discharged coolant and water sprinkled from a sprinkler system of the containment move all foreign substances to a re-circulation sump disposed at a lower end of the containment of the nuclear reactor. Therefore, in order for the foreign substances not to decrease performance of the ECCS, a filtration apparatus is provided in front of an introduction part of a suction pipe guided to an emergency cooling pump.

When a high temperature and high pressure pipe is broken, foreign substances such as fragments of lagging materials, coating materials, etc., are generated and moved toward the sump, and the filtration apparatus functions to filter the foreign substances moved to the sump and supply the filtered water into the re-circulation pump, without interfering with the operation of the re-circulation pump.

The filtration apparatus ensures that the foreign substances generated due to accidents can be filtered and the water can appropriately pass therethrough. In this case, a pressure drop due to the foreign substances must be guaranteed not to exceed an allowable critical value.

A conventional filter screen used in a pressurized water reactor type nuclear power plant has a small screen surface only, and the screen surface is mainly formed of flat grid segments. Thus, when the screen surface is contaminated with fiber settlings, a pressure drop at the screen may be largely increased to an unallowable level.

However, the filtration apparatus having a single surface may be easily deformed by a high pressure, and a small effective filtration area per a unit volume may decrease filtration efficiency. In order to solve the problem, while the number of filtration apparatus may be increased, their installation cost is high, which causes economical problems. Therefore, a filtration apparatus capable of increasing a filtration area per unit volume is still needed.

TECHNICAL PROBLEM

In order to solve the foregoing and/or other problems, it is an aspect of the present invention to provide a strainer wall structure, a filtration method using the same, and a method of fabricating the same that are capable of providing a substantially larger effective filtration area in the same length and width, substantially reducing foreign substances covering a suction surface and a flow resistance of the foreign substances, and reducing a pressure drop at a cooling water pass corresponding thereto.

It is another aspect of the present invention to provide a strainer wall structure, a filtration method using the same, and a method of fabricating the same in which maintenance and installation thereof can be easily performed, and manufacturing and installation costs can be reduced to solve economical problems in exchange and installation thereof.

TECHNICAL SOLUTION

The foregoing and/or other aspects of the present invention may be achieved by providing a strainer wall structure including an inlet side through which cooling water is introduced and an outlet side through which the cooling water is discharged, including: a body having an opening in a direction of the inlet side, closed side surfaces, and an outlet port disposed at one of the closed side surfaces; a filter screen inserted into the opening and formed of a punched plate having a plurality of filter holes; and a modular cassette apparatus including a plurality of first filter plates inserted into the body, each having a plurality of first grooves, and formed by bending the punched plate; and a plurality of second filter plates each having a plurality of second groves inserted into the first grooves, and formed by bending the punched plate, so that the plurality of first filter plates disposed in one direction are perpendicularly assembled to the plurality of second filter plates to form a grid structure.

The grid structure and the filter screen may define suction pockets.

Each of the first filter plates and the second filter plates may have a dual wall structure to form a discharge cap disposed therein.

In the modular cassette apparatus, the width of the first grooves may be equal to the thickness of the second filter plates, and the width of the second grooves may be equal to the thickness of the first filter plates, so that the first filter plates are press-fitted into the second filter plates.

When the cooling water is suctioned into the suction pockets, the cooling water may be surrounded by five surfaces constituted by the first filter plates, the second filter plates and the filter screens.

The filter holes may have a diameter of 1 to 3 mm.

The strainer wall structure may further include a fixing frame coupled to the opening by connection members to fix the modular cassette apparatus into the body.

At least two surfaces of the outer surfaces of the body may have openings, the filter screens may be inserted into the openings, respectively, the modular cassette apparatus may be installed at the filter screens, respectively, and the fixing frames may be coupled to the outer peripheries of the openings, respectively.

The connection members may be pins, screws, rivets, or bolts.

The body may further include L-shaped steel at corners thereof.

The strainer wall structure may further include fixing plates installed in the body to fix the modular cassette apparatus in a direction of the outlet side.

Another aspect of the present invention may be achieved by providing a filtration method using a strainer wall structure including: installing a body in a passage through which cooling water flows; inserting a filter screen formed of a punched plate into an opening of the body; forming a modular cassette apparatus including a plurality of first filter plates inserted into the body, each having a dual layer structure and a plurality of first grooves, and formed by bending the punched plate; and a plurality of second filter plates each having a dual layer structure and a plurality of second groves inserted into the first grooves, and formed by bending the punched plate, so that the plurality of first filter plates disposed in one direction are perpendicularly assembled to the plurality of second filter plates to form a plurality of suction pockets in a grid structure; inserting the modular cassette apparatus into the filter screen; coupling fixing frames to an outer periphery of the opening of the body to fix the modular cassette apparatus into the body; introducing the cooling water into an inlet side to be suctioned into the plurality of suction pockets; and passing the cooling water suctioned into the suction pockets through the dual wall, which forms the suction pockets, or the filter screen, and discharging the filtered cooling water through an outlet port.

The body may include two openings, in inserting the filter screen, the filter screens may be inserted into the openings, respectively, in inserting the modular cassette apparatus, the modular cassette apparatus may be installed in the filter screens, respectively, and in fixing the modular cassette apparatus, the fixing frames may be fixed to corners of the openings, respectively.

In suctioning and discharging the cooling water, the cooling water suctioned into the suction pockets may pass through the filter screen to be discharged to the outlet side, or pass through the dual wall to be introduced into the discharge cap and then pass through the filter screen to be discharged to the outlet side.

Still another aspect of the present invention may be achieved by providing a method of fabricating a strainer wall structure including: forming a punched plate with a large area having a plurality of filter holes, and cutting the punched plate to form a plurality of rectangular holes in a matrix; cutting the punched plate with a large area along a line between the adjacent rectangular holes arranged in a longitudinal direction thereof to fabricate a first base plate, and bending the first base plate twice with respect to a first centerline thereof to form a first filter plate having a dual wall structure and a plurality of first grooves; cutting the punched plate with a large area to cut the rectangular holes arranged in a longitudinal direction thereof to divide them into halves to form a second base plate, and bending the second base plate twice with respect to a second centerline thereof to form a second filter plate having a dual wall structure and a plurality of second grooves; inserting the first grooves and the second grooves into each other to perpendicularly assemble the first filter plates to the second filter plates to form a modular cassette apparatus having a grid structure; inserting the modular cassette apparatus into the body; and coupling fixing frames to an opening of the body using connection members to fix the modular cassette apparatus into the body.

The method may further include, before inserting the modular cassette apparatus, inserting filter screens formed of the punched plates into the body.

The method punched plate may be cut by a laser to form the rectangular holes.

According to a strainer wall structure of the present invention, it is possible to provide a substantially larger effective filtration area in the same length and width. Therefore, a flow resistance of settlings and foreign substances covering a suction surface can be substantially reduced. In addition, a pressure drop generated along the strainer wall structure can be reduced depending on reduction in flow resistance.

Further, since the strainer wall structure of the present invention is fabricated by assembling a filter screen having a punched plate, a first filter plate and a second filter plate, without welding, it is possible to easily perform maintenance and installation thereof. Furthermore, since a plurality of first filter plates and second filter plates are vertically arranged, a load pressure can be distributed to increase structural integrity.

DESCRIPTION OF DRAWINGS

The above and other aspects and advantages of the present invention will become apparent and more readily appreciated from the following description of exemplary embodiments, taken in conjunction with the accompanying drawings of which.

*Description of Major Reference Numerals*

| | |
|---|---|
| 10: Strainer wall structure | 20: Filter hole |
| 30: Inlet side | 40: Outlet side |
| 50: Large punched plate | 60: Rectangular hole |
| 70: First base plate | 71: First centerline |
| 80: Second base plate | 81: Second centerline |
| 100: Body | 110: Opening |
| 120: Closed surface | 130: L-shaped steel |
| 140: Outlet port | 150: Fixed plate |
| 200: Filter screen | 210: Filter screen plate |
| 220: Outer periphery plate | 300: First filter plate |
| 310: First groove | 320: Dual wall of first filter plate |
| 330: Discharge cap of first filter plate | 400: Second filter plate |
| 410: Second groove | 420: Dual wall of second filter plate |
| 430: Discharge cap of second filter plate | 500: Fixed frame |
| 510: Connection member | 520: First coupling member |
| 521: Second coupling member | 600: Modular cassette apparatus |
| 610: Suction pocket | 700: Discharge space |
| D: Diameter of filter hole | $L_{F1}$: Length of first filter plate |
| $H_{F1}$: Height of first filter plate | $t_{f1}$: Thickness of first filter plate |
| $I_{g1}$: Interval of first grooves | $W_{g1}$: Width of first groove |
| $H_{g1}$: Depth of first groove | $L_{f2}$: Length of second filter plate |
| $H_{F2}$: Height of second filter plate | $t_{f2}$: Thickness of second filter plate |
| $I_{g2}$: Interval of second grooves | $W_{g2}$: Width of second groove |
| $H_{g2}$: Depth of second groove | |

DETAILED DESCRIPTION

Reference will now be made in detail to the embodiments of the present invention, examples of which are illustrated in the accompanying drawings.

Figure 1:
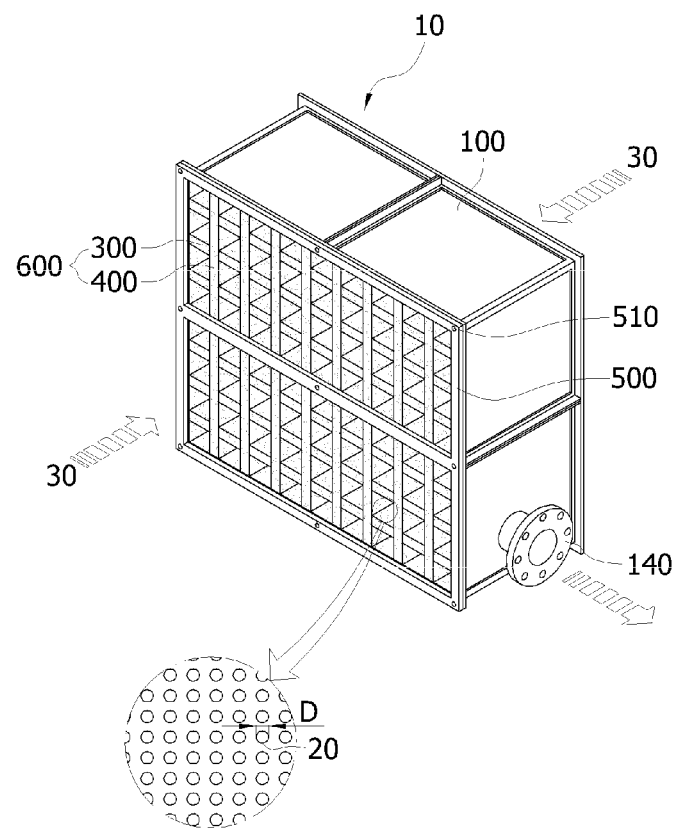
FIG. 1 is a perspective view of a strainer wall structure in accordance with an exemplary embodiment of the present invention.
Figure 2:
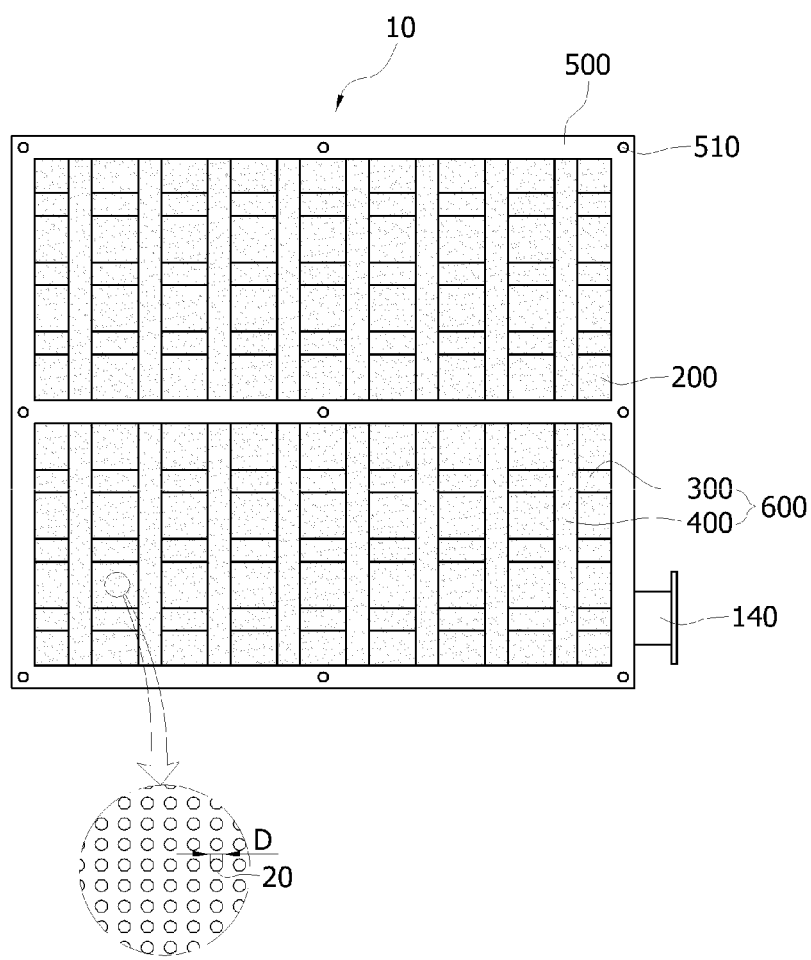
FIG. 2 is a front view of a strainer wall structure in accordance with an exemplary embodiment of the present invention.
Figure 3:
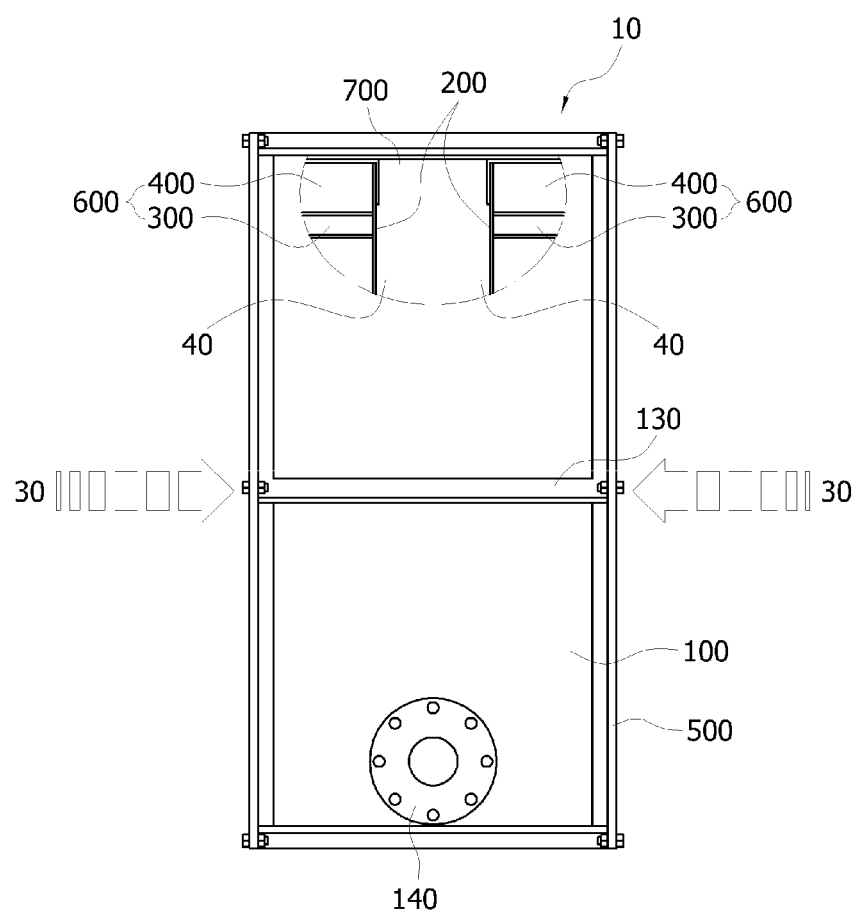
FIG. 3 is a side view of a strainer wall structure in accordance with an exemplary embodiment of the present invention.

FIG. 1 is a perspective view of a strainer wall structure in accordance with an exemplary embodiment of the present invention, FIG. 2 is a front view of a strainer wall structure in accordance with an exemplary embodiment of the present invention, and FIG. 3 is a side view of a strainer wall structure in accordance with an exemplary embodiment of the present invention.

As shown in FIG. 1, a strainer wall structure 10 of the present invention is fixedly installed at a passage through which cooling water flows. The cooling water flows into an inlet side 30 of the strainer wall structure 10 to be discharged through an outlet port 140. While two inlet sides 30 are provided as shown in FIG. 1, one or more inlet sides may be provided.

A filter screen 200 is inserted into a body 100 having openings 110 formed at the inlet sides 30 and closed side surfaces 120.

In addition, a modular cassette apparatus 600, in which a first filter plate 300 and a second filter plate 400 having a dual wall (320, 320) structure formed of punched plates are assembled in a grid structure, is inserted into the filter screen 200.

As shown in FIG. 2, the modular cassette apparatus 600 having a grid structure and the filter screen 200 (see FIG. 4) are installed in the body 100. In addition, the first filter plate 300, the second filter plate 400 and the filter screen 200 constituting the modular cassette apparatus 600 are formed of punched plates each having a plurality of filter holes 20.

The diameter D of the filter hole 20 is designed to be 2.5 mm in this embodiment, and is preferably 1 to 3 mm in consideration of an installation position of the filtration apparatus or the size of foreign substances.

As shown in FIG. 3, the outlet port 140 is installed at a lower end of one side surface of the body 100 to discharge cooling water. While not seen from the exterior, referring to a partially cut view of FIG. 3, it will be appreciated that two modular cassette apparatus 600 in which the first filter plate 300 and the second filter plate 400 are assembled are inserted in the body 200 together with the filter screens 200, respectively. In addition, a discharge space 700 is provided between the two filter screens 200.

Figure 4:
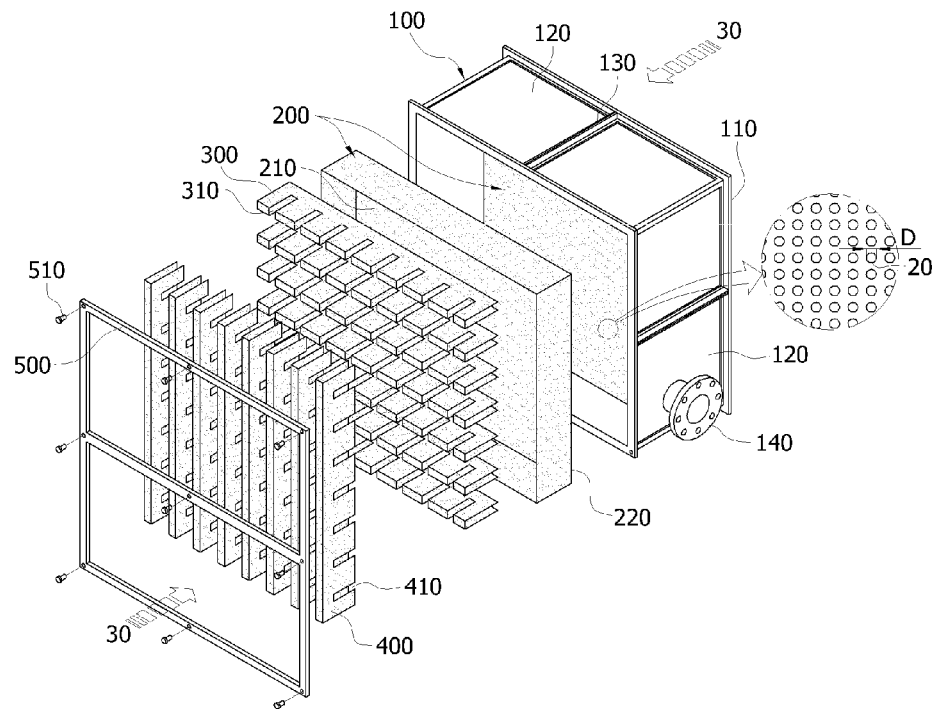
FIG. 4 is an exploded perspective view of a strainer wall structure in accordance with an exemplary embodiment of the present invention.

FIG. 4 is an exploded perspective view of a strainer wall structure in accordance with an exemplary embodiment of the present invention.

As shown in FIG. 4, a fixing frame 500 is coupled to an outer periphery of an opening 110 of the body 100 by a connection member 510 to fix the modular cassette apparatus 600.

The strainer wall structure 10 is fabricated by assembling the respective components, without welding the components, to each other. In particular, the modular cassette apparatus 600 having a grid structure formed of a plurality of suction pockets 610 is assembled by inserting the first filter plate 300 and the second filter plate 400 into first grooves 310 and second grooves 410, respectively, without welding or separate coupling means.

Side surfaces of the body 100 are formed of closed surfaces 120, and the outlet port 140 is installed at one side surface. The opening 110 is formed in a direction of the inlet side 30 to introduce the cooling water into the opening 110. In this embodiment, two inlet sides 30 are installed to form the body 110 having openings 110 at both sides thereof.

Two filter screens 200 are inserted into the body 100 through the inlet sides 30, respectively. While FIG. 4 shows one side only, the filter screen 200, the modular cassette apparatus 600 and the fixed frame 500 are assembled through the opening 110 of the body 100 at the other inlet side 30.

In this embodiment, the filter screen 200 is formed of stainless steel, and a filter screen plate 210 and the outer periphery plate 220 are formed of punched plates having a plurality of filter holes 20. In addition, the filter screen 200 is surrounded by four outer periphery plates 200 having lengths corresponding to the heights $H_{f1}$ and $H_{f2}$ of the first filter plate 300 and the second filter plate 400.

Each modular cassette apparatus 600 is inserted into each filter screen 200. Since they are also assembled by insertion thereof, there is no need for welding or coupling members. First, the plurality of first filter plates 300 are disposed at the filter screen 200 at predetermined intervals. In this embodiment, seven first filter plates 300 are disposed. Each of the first filter plates 300 has first grooves 310 formed at predetermined intervals. As shown in FIG. 4, the first grooves 310 are formed in a direction of the inlet side 30. The interval of the first grooves 310 is designed within a range of substantially 80 to 150 mm, and 110 mm in this embodiment.

In addition, the second filter plates 400 cooperate with and are perpendicularly assembled to the first filter plates 300 to form a grid structure. The second filter plates 400 are also formed of punched plates having a plurality of filter holes 20, each of which is formed of a dual wall 420. The second grooves 410 of the second filter plate 400 are coupled and assembled to the first grooves 310 of the first filter plate 300. Meanwhile, the second grooves 410 of the second filter plate 400 are formed in a direction of an outlet side. An interval Ig2 of the first grooves 310 is designed within a range of substantially 80 to 150 mm, and 100 mm in this embodiment.

As shown in FIG. 4, the seven first filter plates 300 and the eight second filter plates 400 corresponding thereto are assembled to each other by perpendicularly fitting the first grooves 310 to the second grooves 410 to form the modular cassette apparatus 600 having a grid structure. Specifically, the thickness $t_{f1}$ of the first filter plate 300 is equal to the width $W_{g2}$ of the second groove 410 (designed as 30 mm in this embodiment, $t_{f1}=W_{g2}$), and the thickness $t_{f2}$ of the second filter plate 400 is equal to the width $W_{g1}$ of the first groove 310 (designed as 30 mm in this embodiment, $t_{f2}=W_{g1}$). In addition, the depth $H_{g1}$ of the first groove 310 is equal to a distance of the height $H_{f2}$ of the second filter plate 400 minus the depth $H_{g2}$ of the second groove 410 ($H_{g1}=H_{f2}-H_{g2}$). Further, the depth $H_{g2}$ of the second groove 410 is equal to a distance of the height $H_{f1}$ of the first filter plate 300 minus the depth $H_{g1}$ of the first groove 310 ($H_{g2}=H_{f1}-H_{g1}$). Therefore, the first grooves and the second grooves are perpendicularly engaged to form a grid structure.

As described in this embodiment, the seven first filter plates 300 and the eight second filter plates 400 are assembled to form the modular cassette apparatus 600 having a grid structure. The modular cassette apparatus 600 includes a plurality of suction pockets 610, and in this embodiment, 72 suction pockets. The suction pockets 610 are opened in a direction of the inlet side 30, surrounded by the filter screen 200 at the outlet side 40, and surrounded by the dual wall 320 of the first filter plate 300 and the dual wall 420 of the second filter plate 400 at the remaining four surfaces. Therefore, the cooling water introduced into the suction pocket 610 is filtered through the filter holes 20 formed at the five surfaces to be introduced into the discharge space 700.

After the modular cassette apparatus 600 are assembled to the filter screens 200 inserted into the two openings 110 of the body, respectively, the fixed frame 500 is coupled to an outer periphery of the opening 110 by connection members 510 (fixing pins, in this embodiment) to fix the modular cassette apparatus 600 (while FIG. 4 shows an insertion operation through one opening, the other opening is also assembled in the same manner). The connection members 520 may be pins, screws, rivets, bolts, etc.

Figure 5:
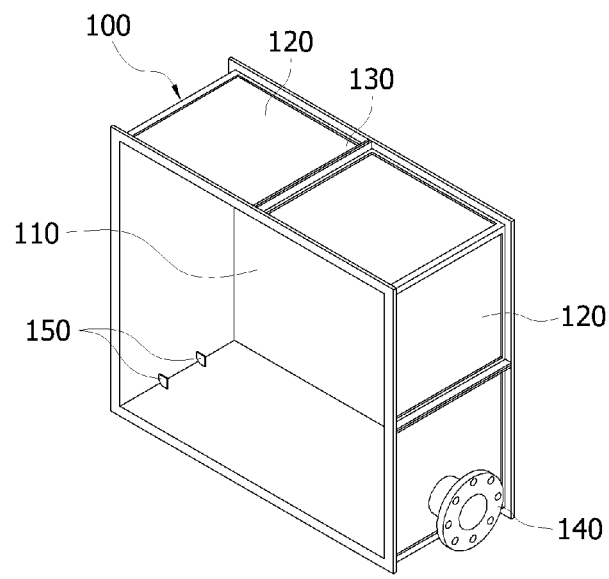
FIG. 5 is a perspective view of a body in accordance with an exemplary embodiment of the present invention.
Figure 6:
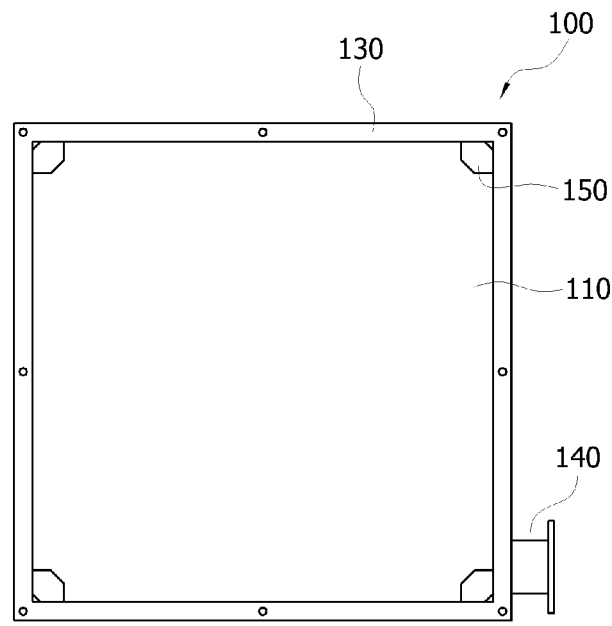
FIG. 6 is a front view of a body in accordance with an exemplary embodiment of the present invention when seen from an open side.

FIG. 5 is a perspective view of a body in accordance with an exemplary embodiment of the present invention, and FIG. 6 is a front view of a body in accordance with an exemplary embodiment of the present invention when seen from an open side.

As shown in FIG. 5, side surfaces of the body 100 are provided as closed surfaces, and the inlet side 30 is provided as an opening 110. Fixed plates 150 are installed in the body to fix the filter screen 200 in a direction of the outlet side 40.

Eight fixed plates 150 are installed at inner corners in the body. As shown in FIG. 6, when the cooling water is introduced into the suction pocket 610, since the body 100 receives a high pressure, an L-shaped steel 130 may be welded to the outer periphery to reinforce the body. In this embodiment, the L-shaped steel 130 is coupled to a center part of the side surface to maintain the shape of the body even under a high pressure.

It will be appreciated that the hollow outlet port 140 is installed at a lower end of one side surface of the body and is reinforced by the L-shaped steel 130 at the corners and the center part of the closed surface 120. In addition, as shown in a partially cut view, the fixed plates 150 are installed in the body. When the two filter screens 200 are inserted through the opening 110, the discharge space 700 is formed between the two filter screens 200 (i.e., between the two fixed plates 150).

Figure 7:
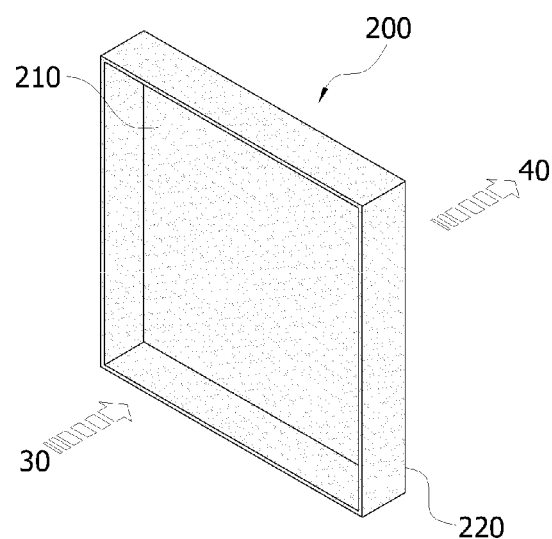
FIG. 7 is a perspective view of a filter screen in accordance with an exemplary embodiment of the present invention.

FIG. 7 is a perspective view of a filter screen in accordance with an exemplary embodiment of the present invention.

The filter screen plate 210 formed of a punched plate and the outer periphery thereof are surrounded by outer periphery plates 220 having a predetermined height. The diameter D of the filter holes 20 of the punched plate is 1 to 3 mm, which is designed as 2.5 mm in this embodiment. The diameter D of the filter holes 20 is designed in consideration of the size, etc., of foreign substances generated in the containment and arriving at the filtration apparatus upon accidents. The height of the outer periphery plates 220 is equal to the height of the first filter plate 300 and the second filter plate 400 (145 mm in this embodiment).

Figure 8:
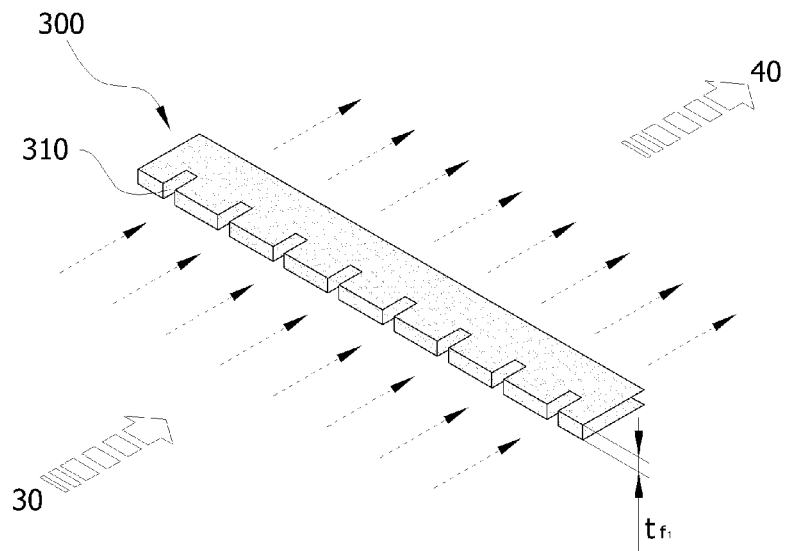
FIG. 8 is a perspective view of a first filter plate in accordance with an exemplary embodiment of the present invention when seen from an inlet side.
Figure 9:
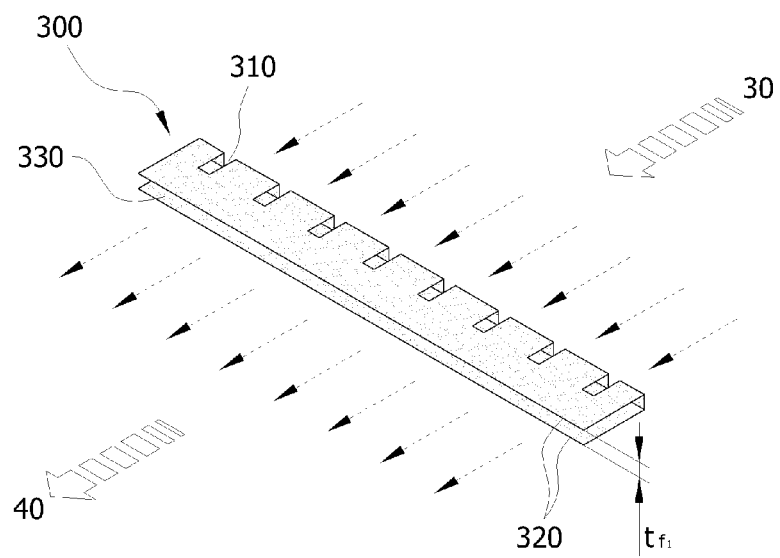
FIG. 9 is a perspective view of the first filter plate in accordance with an exemplary embodiment of the present invention when seen from an outlet side.
Figure 10:
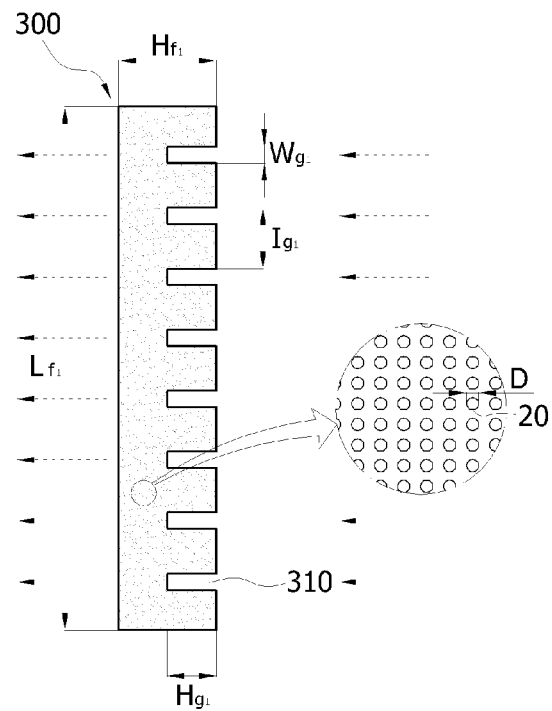
FIG. 10 is a plan view of FIG. 9.

FIG. 8 is a perspective view of a first filter plate in accordance with an exemplary embodiment of the present invention when seen from an inlet side, FIG. 9 is a perspective view of the first filter plate in accordance with an exemplary embodiment of the present invention when seen from an outlet side, and FIG. 10 is a plan view of FIG. 9.

As shown in FIG. 8, the first filter plate 300 is formed of a punched plate and includes a plurality of first grooves 310. The first grooves 310 are formed in a direction of the inlet side 30. In this embodiment, the first filter plate 300 has eight first grooves 310. A dual wall 320 formed of a punched plate forms an outer surface of the suction pocket 610. In addition, the cooling water passes through the dual wall 320 to be introduced into a discharge cap 330. A flow direction of the cooling water is shown by arrows.

As shown in FIG. 9, the first filter plate 300 is formed of a dual wall 320 structure, and includes the discharge cap 330. The cooling water is filtered through the dual wall 320 formed of a punched plate and introduced into the discharge cap 330 to be discharged through the filter screen plate 210. A flow direction of the cooling water is shown by arrows.

The second filter plates 400 are perpendicularly inserted into the first grooves 310 to assemble the first filter plates 300 to the second filter plates 400.

As shown in FIG. 10, in a specific embodiment, eight first grooves 310 are disposed at an interval $I_{g1}$ of 110 mm. The width $W_{g1}$ of the first grooves 310 is 30 mm, the depth $H_{g1}$ is 72.5 mm, and the thickness $t_{f1}$ is 30 mm. In addition, the diameter D of the filter holes 20 may be 1 to 3 mm. A flow direction of the cooling water is shown by arrows.

However, it will be appreciated that limitations to these specific numbers are described for the illustrative purpose only, and thus, should not affect determination of the scope of the present invention due to the specific numbers while maintaining the technical sprit and equivalency of the present invention.

Figure 11:
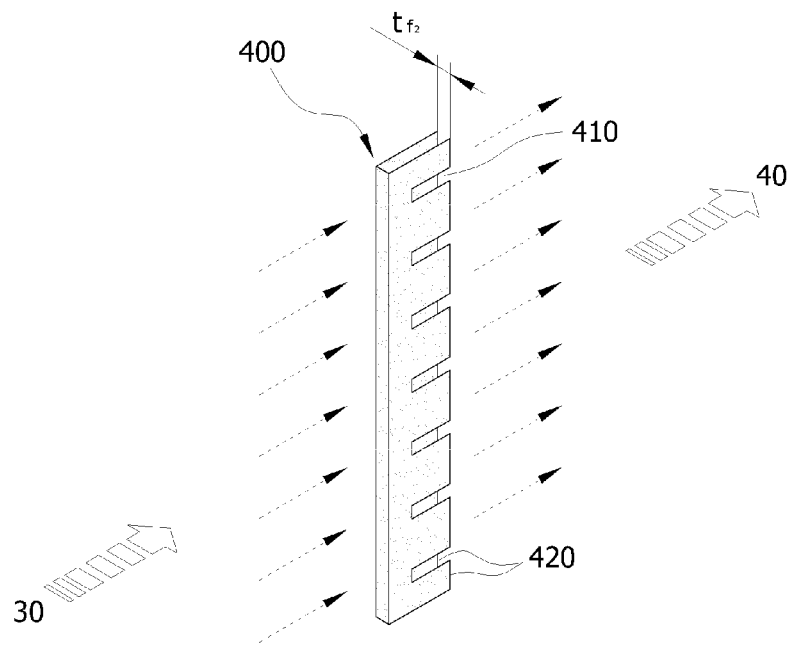
FIG. 11 is a perspective view of a second filter plate in accordance with an exemplary embodiment of the present invention when seen from an inlet side.
Figure 12:
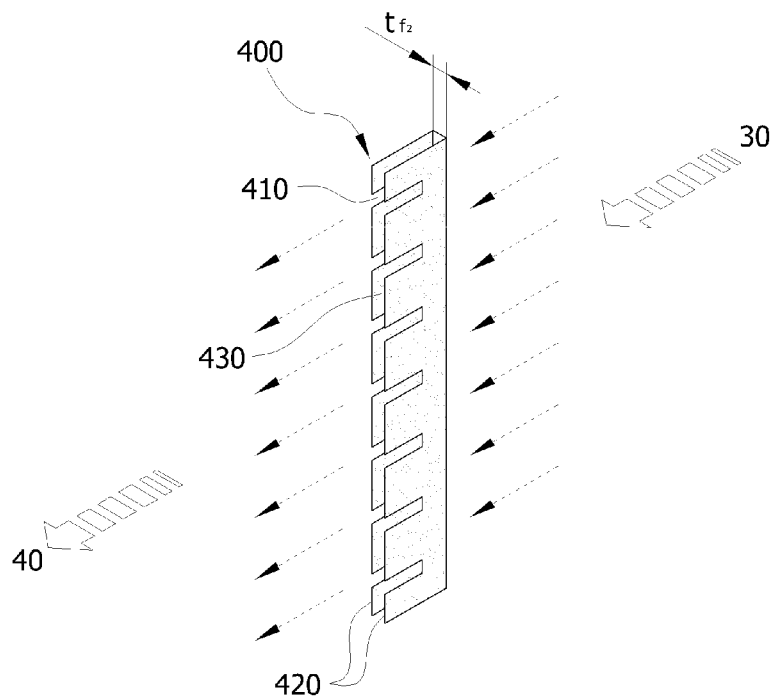
FIG. 12 is a perspective view of the second filter plate in accordance with an exemplary embodiment of the present invention when seen from an outlet side.
Figure 13:
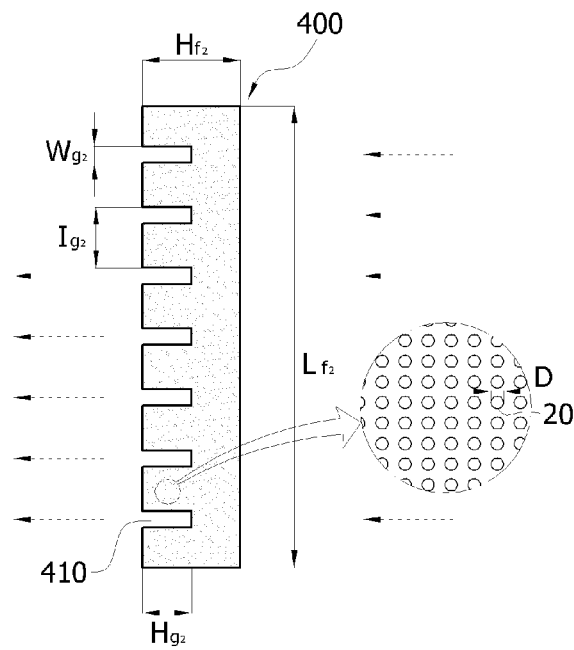
FIG. 13 is a side view of FIG. 12.

FIG. 11 is a perspective view of a second filter plate in accordance with an exemplary embodiment of the present invention when seen from an inlet side, FIG. 12 is a perspective view of the second filter plate in accordance with an exemplary embodiment of the present invention when seen from an outlet side, and FIG. 13 is a side view of FIG. 12.

As shown in FIGS. 11 and 12, the second filter plate 400 is formed of a punched plate having a plurality of filter holes 20. In addition, the second filter plate 400 has a dual wall 420 structure and includes the discharge cap 430 therein. It will be appreciated that the seven second grooves 410 are formed in a direction of the outlet side 40. The seven first filter plates 300 are inserted into the second grooves 410, respectively, so that the seven first filter plates 300 are perpendicularly assembled to the eight filter plates 400 to form the modular cassette apparatus 600 having a grid structure. The thickness $t_{f2}$ of the second filter plates 400 is designed as 30 mm equal to that of the first filter plates 300, which must be equal to the width $W_{g1}$ of the first grooves 310 of the first filter plates 300 ($t_{f2}=W_{g1}$). A flow direction of the cooling water is shown by arrows.

As shown in FIG. 13, since the interval $I_{g2}$ of the second grooves 410 of the second filter plate 400 is designed as 130 mm and the width $W_{g2}$ of the second grooves 410 is equal to the thickness $t_{f1}$ of the first filter plate 300 (30 mm in this embodiment), the first filter plates 300 can be inserted into the second grooves 410, respectively. In addition, two modular cassette apparatus 600, in which the seven first filter plates 300 are perpendicularly assembled to the eight second filter plates 400, respectively, are inserted into the filter screen 200. A flow direction of the cooling water is shown by arrows. The cooling water passes through the dual wall 420 to be introduced into the discharge cap 430, and the introduced cooling water passes through the filter screen plate 210 to be discharged to the outlet side 40. Further, the fixed frames 500 are installed at corners of the opening 110 by the connection members 510 to fix the modular cassette apparatus 600.

Figure 14:
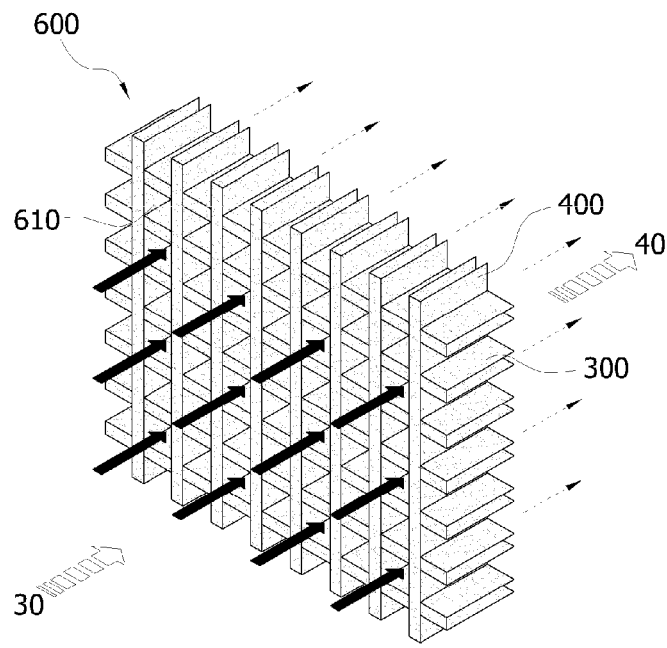
FIG. 14 is a perspective view of a modular cassette apparatus in accordance with an exemplary embodiment of the present invention.
Figure 15:
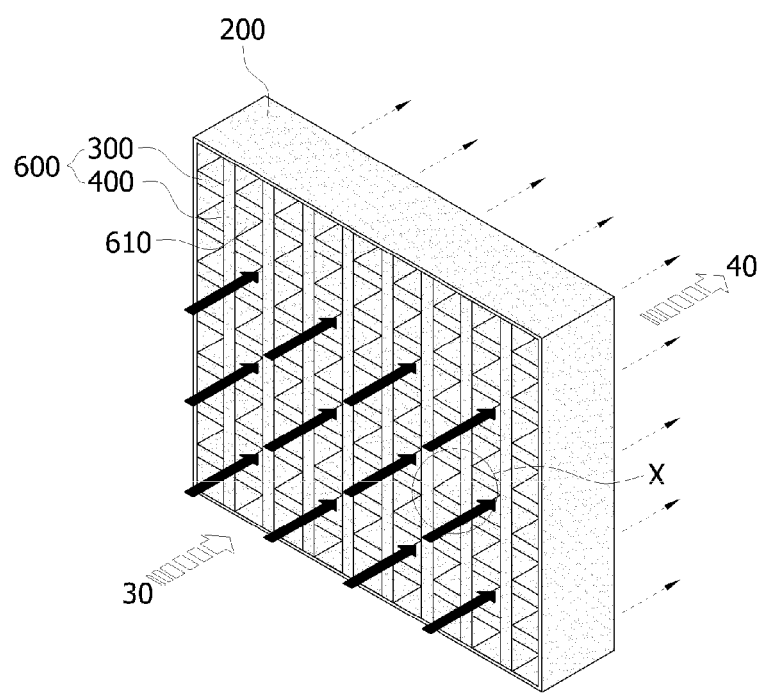
FIG. 15 is a perspective view of a filter screen into which the modular cassette apparatus in accordance with an exemplary embodiment of the present invention is inserted.

FIG. 14 is a perspective view of a modular cassette apparatus in accordance with an exemplary embodiment of the present invention, and FIG. 15 is a perspective view of a filter screen into which the modular cassette apparatus in accordance with an exemplary embodiment of the present invention is inserted.

As shown in FIG. 14, since the thickness $t_{f1}$ of the first filter plates 300 is equal to the width $W_{g2}$ of the second grooves 410, the first filter plates 300 are inserted into the seven second grooves 410, respectively. In addition, since the thickness $t_{f2}$ of the second filter plates 400 is equal to the width $W_{g1}$ of the first grooves 310, the second filter plates 400 are inserted into the eight first grooves 310 to be assembled thereto. The modular cassette apparatus 600 includes a plurality of suction pockets 610 (72 suction pockets 610 in this embodiment). The cooling water in the inlet side 30 is suctioned into the suction pockets 610. A flow direction of the cooling water is shown by arrows. The cooling water in the inlet side 30 is suctioned into the suction pockets 610 and then filtered to be discharged to the outlet side 40.

As shown in FIG. 15, the cooling water is suctioned into the suction pockets 610 from the inlet side 30 to be filtered by the first filter plates 300, the second filter plates 400 and the filter screen plate 210 and then discharged to the outlet side 40. The filter screens 200 into which the modular cassette apparatus 600 are inserted are inserted into the openings 110 of the body 100, respectively.

Figure 16:
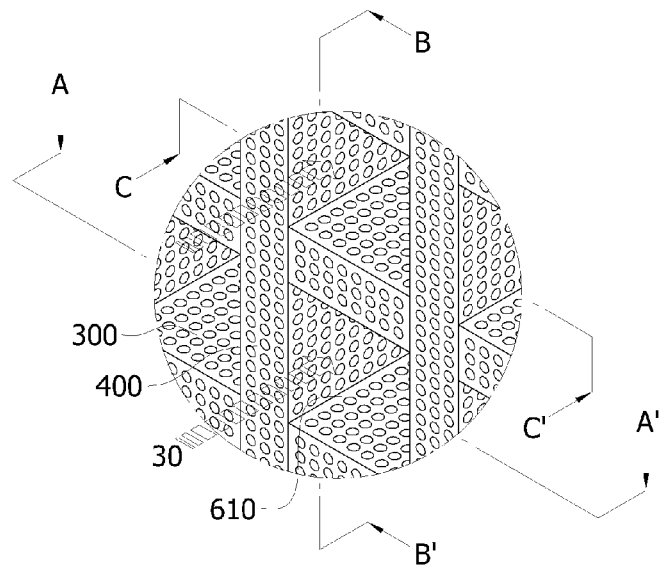
FIG. 16 is an enlarged view of a suction pocket in accordance with an exemplary embodiment of the present invention.
Figure 17:
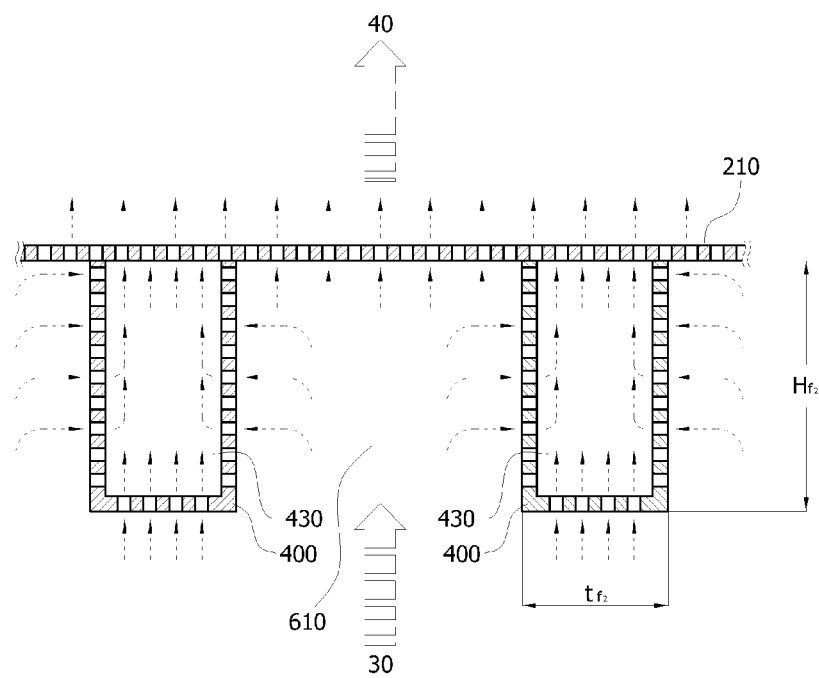
FIG. 17 is a cross-sectional view taken along line A-A' of FIG. 16.
Figure 18:
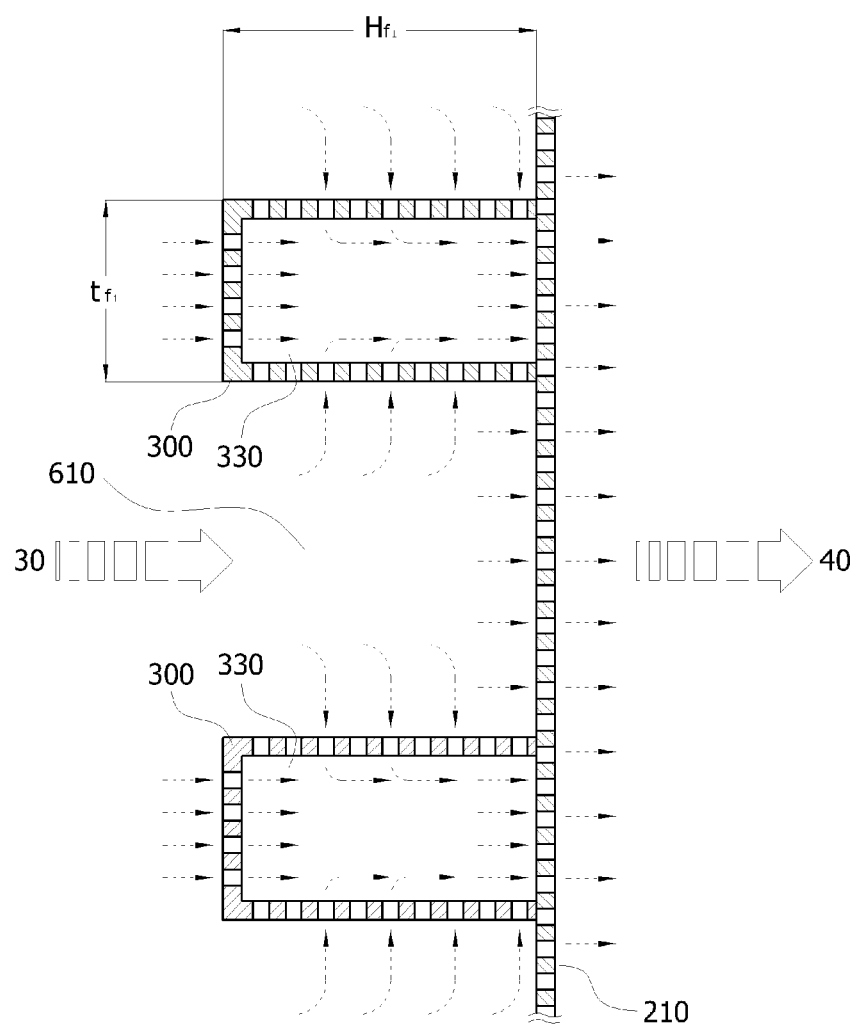
FIG. 18 is a cross-sectional view taken along line B-B' of FIG. 16.
Figure 19:
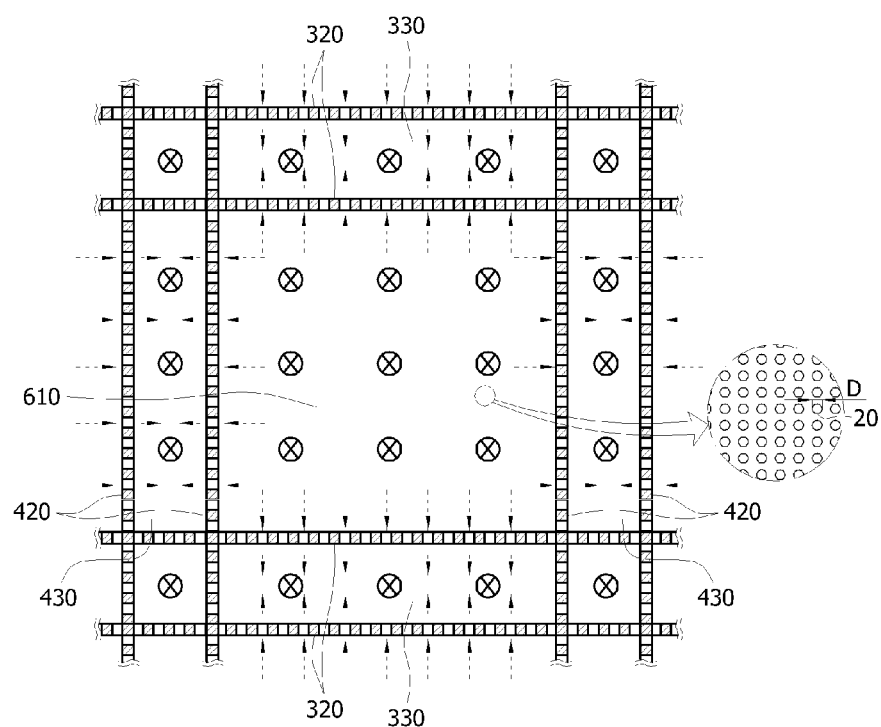
FIG. 19 is a cross-sectional view taken along line C-C' of FIG. 16.

FIG. 16 is an enlarged view of a suction pocket in accordance with an exemplary embodiment of the present invention, FIG. 17 is a cross-sectional view taken along line A-A' of FIG. 16, FIG. 18 is a cross-sectional view taken along line B-B' of FIG. 16, and FIG. 19 is a cross-sectional view taken along line C-C' of FIG. 16.

As shown in FIG. 16, the cooling water is introduced through the inlet side 30 to be suctioned into the suction pockets 610. Side surfaces of each suction pocket 610 are constituted by the dual walls 320 and 420 of the first filter plate 300 and the second filter plate 400, and the filter screen plate 210 is installed at the outlet side 40. Therefore, the cooling water introduced into the suction pockets 610 is surrounded by five surfaces. All of the five surfaces are formed of punched plates. Therefore, a filtration area per unit volume can be increased.

Specifically, the introduced cooling water may pass through the dual wall 320 or 420 of the first filter plate 300 or the second filter plate 400 constituting the side surfaces of the suction pockets 610, or pass through the filter screen plate 210. The cooling water passing through the first filter plates 300 or the second filter plates 400 is introduced into the discharge caps 330 and 430, and the cooling water introduced into the discharge caps 330 and 430 passes through the filtered screen plates 210 to be introduced into the discharge space 700 and then discharged to the outlet port 140. In addition, the cooling water passing through the filter screen plate 210 is introduced into the discharge space 700 to be discharged to the outlet port 140.

As show in FIG. 17, the cooling water is suctioned into the suction pockets 610 from the inlet side 30. Then, the suctioned cooling water may be directly discharged to the outlet side 40 through the filter screen plate 210. In addition, the cooling water passes through the dual wall 420 of the second filter plate 400 to be introduced into the discharge cap 430. The cooling water introduced into the discharge cap 430 passes through the filter screen plate 210 to be discharged to the outlet side 40.

In this embodiment, since the two modular cassette apparatus 600 are symmetrically provided, the cooling water discharged to the outlet side is in the discharge space 700.

As shown in FIG. 18, the cooling water is suctioned into the suction pockets 610. Then, the suctioned cooling water may be immediately discharged to the outlet side 40 through the filter screen plate 210. In addition, the cooling water passes through the dual walls 320 of the first filter plates 300 to be introduced into the discharge caps 330. The cooling water introduced into the discharge cap 330 passes through the filter screen plate 210 to be discharged to the outlet side 40.

In FIG. 19, $\hat{x}$ means a direction that the cooling water flows through the figure, and a flow direction of the cooling water is shown by arrows.

As shown in FIG. 19, the cooling water introduced into the suction pockets 620 is introduced into the discharge caps 330 and 430 through the dual walls 320 and 420 of the first filter plates 300 and the second filter plates, which are formed of punched plates. The cooling water introduced into the discharge caps 330 and 430 is filtered again by the filter screen plate 210 to be discharged to the outlet side 40. The cooling water discharged to the outlet side 40 is introduced into the discharge space between the two filter screens 200 to be discharged through the outlet port 140 installed at the body 100.

<Filtration Method Using Strainer Wall Structure>

Figure 20:
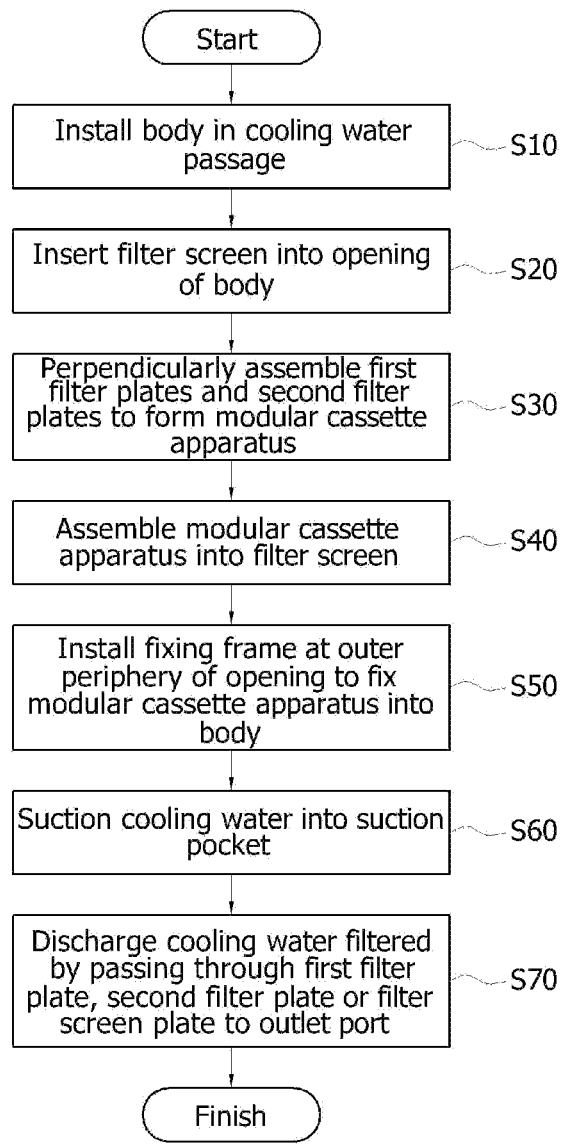
FIG. 20 is a flowchart of a filtration method using a strainer wall structure in accordance with an exemplary embodiment of the present invention.

Hereinafter, a filtration method using a strainer wall structure 10 of the present invention will be described. FIG. 20 is a flowchart of a filtration method using a strainer wall structure in accordance with an exemplary embodiment of the present invention.

First, a body 100 is fixed to a passage through which cooling water flows (S10). As described above, the body 100 includes openings 110 in a direction of an inlet side 30, closed side surfaces 120, and an outlet port 140 at one of the closed side surfaces 120.

Then, filter screens 200 are inserted into the openings 110 of the body 110 (S200). In this embodiment, two openings 110 are provided. Therefore, the filter screens 200 are inserted into the openings 110, respectively. Each of the filter screens 200 includes a filter screen plate 210 formed of a punched plate, and an outer periphery plate 220 formed of a punched plate similar to the filter screen plate 210 and surrounding an outer periphery of the filter screen plate 210. The filter screen 200 is fixed by fixing plates 150 in the body 100 at an outlet side 40, and a discharge space 700 is formed in the body 100 between the two filter screens 200.

Next, a modular cassette apparatus 600 including a plurality of suction pockets 610 formed by perpendicularly assembling seven first filter plates 300 each having eight first grooves 310 and eight second filter plates 400 each having seven second grooves 410 is provided (S30). Each of the first filter plates 300 is formed of a punched plate having a plurality of filter holes 20 and has a dual wall 320 structure to form a discharge cap 330 therein. The first grooves 310 are formed in a direction of the inlet side 30.

Each of the second filter plates 400 is also formed of a punched plate having a plurality of filter holes 20 and has a dual wall 420 structure to form a discharge cap 430 therein. The second grooves 410 are formed in a direction of the outlet side 40. Therefore, the first filter plates 300 and the second filter plates 400 are perpendicularly assembled by the first grooves 310 and the second grooves 410 to form a grid structure of modular cassette apparatus 600 including a plurality of suction pockets 610. Two modular cassette apparatus 600 are installed in the two filter screens 200.

Next, the modular cassette apparatus 600 are inserted and assembled into the filter screens 200 (S40). In this embodiment, since two inlet sides 30 are provided, the modular cassette apparatus 600 are assembled to the filter screens 200 inserted into the inlet sides 30.

Fixing frames 500 are coupled to an outer periphery of the opening 110 by connection members 510 to fix the modular cassette apparatus 600 (S50). The connection members 510 may be pins, screws, rivets, or bolts. The fixing frames 500 are installed at corners of the opening 110 of the body 100. Therefore, the first filter plates 300, the second filter plates 400 and the filter screens 200 form the strainer wall structure 10 by being assembled each other without welding.

Next, the cooling water is introduced into the suction pockets 610 (S60). The introduced cooling water passes through the filter holes 20 of the first filter plates 300, the second filter plates 400 and the filter screen plates 210, which are formed of punched plates, to be filtered and introduced into the discharge space 700. Then, the filtered cooling water is discharged through the outlet port 140 (S70).

Method of Fabricating Strainer Wall Structure

Figure 21:
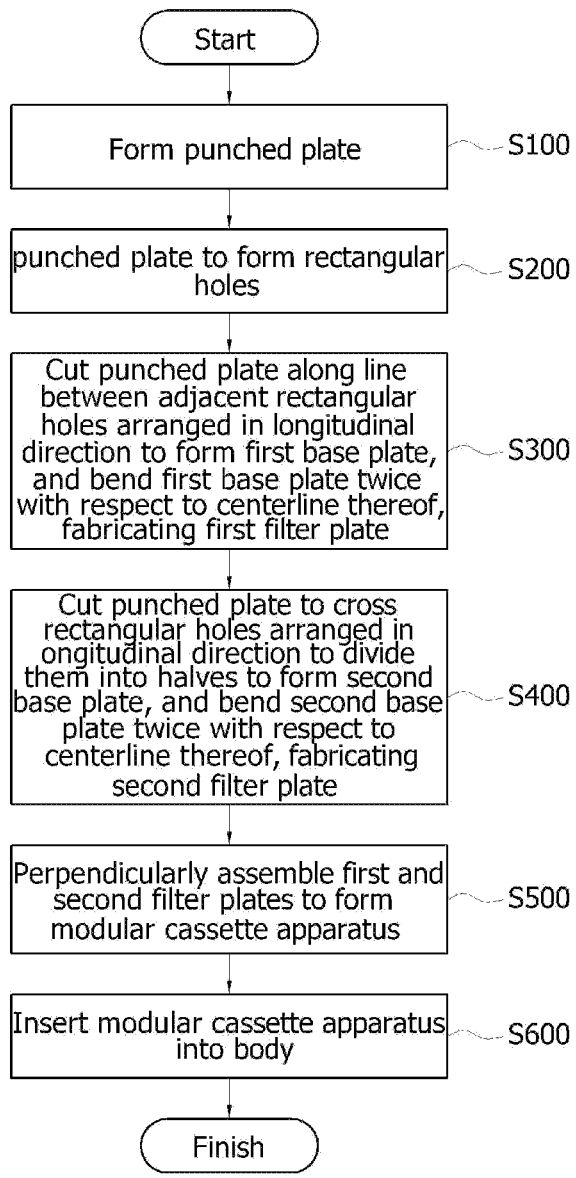
FIG. 21 is a flowchart of a method of fabricating a strainer wall structure in accordance with an exemplary embodiment of the present invention.

Hereinafter, a method of fabricating a strainer wall surface 10 of the present invention will be described. FIG. 21 is a flowchart of a method of fabricating a strainer wall structure in accordance with an exemplary embodiment of the present invention, and FIG. 22 is a cross-sectional view showing a method of fabricating a first filter plate and a second filter plate in accordance with an exemplary embodiment of the present invention.

First, a plate (stainless steel in this embodiment) having a certain thickness (preferably, about 2 mm) is punched to form a plurality of filter holes 20 (having a diameter of 1 to 3 mm in this embodiment) (S100). Then, the punched plate 50 having a large area is cut to form a plurality of rectangular holes, which will be formed as first grooves 310 or second grooves 410 of first filter plates 300 and second filter plates 400 (S200).

Figure 22:
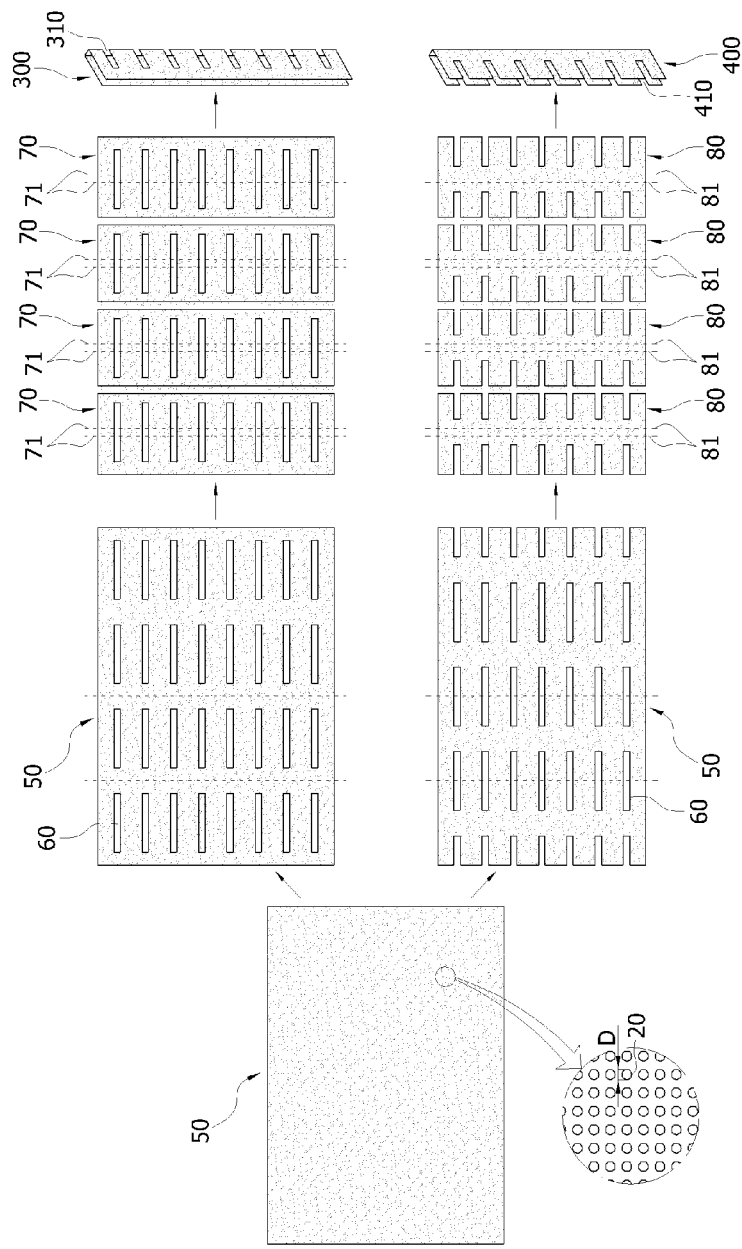
FIG. 22 is a cross-sectional view showing a method of fabricating a first filter plate and a second filter plate in accordance with an exemplary embodiment of the present invention.

As shown in FIG. 22, the rectangular holes 60 are formed to be aligned in a matrix. The rectangular holes 60 may be formed by cutting the punched plate 50 using a laser beam. Then, the punched plate 50 having the plurality of rectangular holes 60 is cut. Two kinds of cutting methods are provided. The first filter plates 300 may be fabricated or the second filter plates 400 may be fabricated depending on the cutting methods.

Specifically, in order to fabricate the first filter plates 300, as shown in an upper part of FIG. 22, the punched plate 50 having the plurality of rectangular holes 60 is cut along a line between adjacent rectangular holes 60 arranged in a longitudinal direction thereof. Therefore, the punched plate 50 is cut to form first base plates 70 each having a row of rectangular holes 60. Next, each of the first base plates 70 is bent twice with respect to a first centerline 71 of the rectangular holes 60 to fabricate first filter plate 300 (S300).

In addition, in order to fabricate the second filter plates 400, as shown in a lower part of FIG. 22, the punched plate 50 having the plurality of rectangular holes 60 is cut to cross the rectangular holes arranged in a longitudinal direction thereof to divide them into halves. Therefore, second base plates 80 having grooves symmetrically disposed at both sides are fabricated. Then, each of the second base plates 80 is bent twice with respect to a second centerline 81 to form the second filter plate 400 (S400). That is, the first filter plate 300 and the second filter plate 400 are fabricated by forming the rectangular holes 60 in the punched plate 50 with a large area using a laser beam, cutting the punched plate 50 through the above two methods, and bending the cut first base plate 70 or the second base plate 80 twice with respect to the first centerline 71 or the second centerline 81, with no welding.

As described above, the plurality of first grooves 310 and second grooves 410 are formed in the first filter plates 300 and the second filter plates 400. The first and second filter plates 300 and 400 are perpendicularly assembled to form the modular cassette apparatus 600 having a grid structure (S500).

Next, the filter screen 200 is inserted into the body 100, the modular cassette apparatus 600 is inserted into the filter screen 200, and then, the fixing frame 500 is coupled to the body 100, fabricating the strainer wall structure 10 (S600).

Another Embodiment of Strainer Wall Structure

Figure 23:
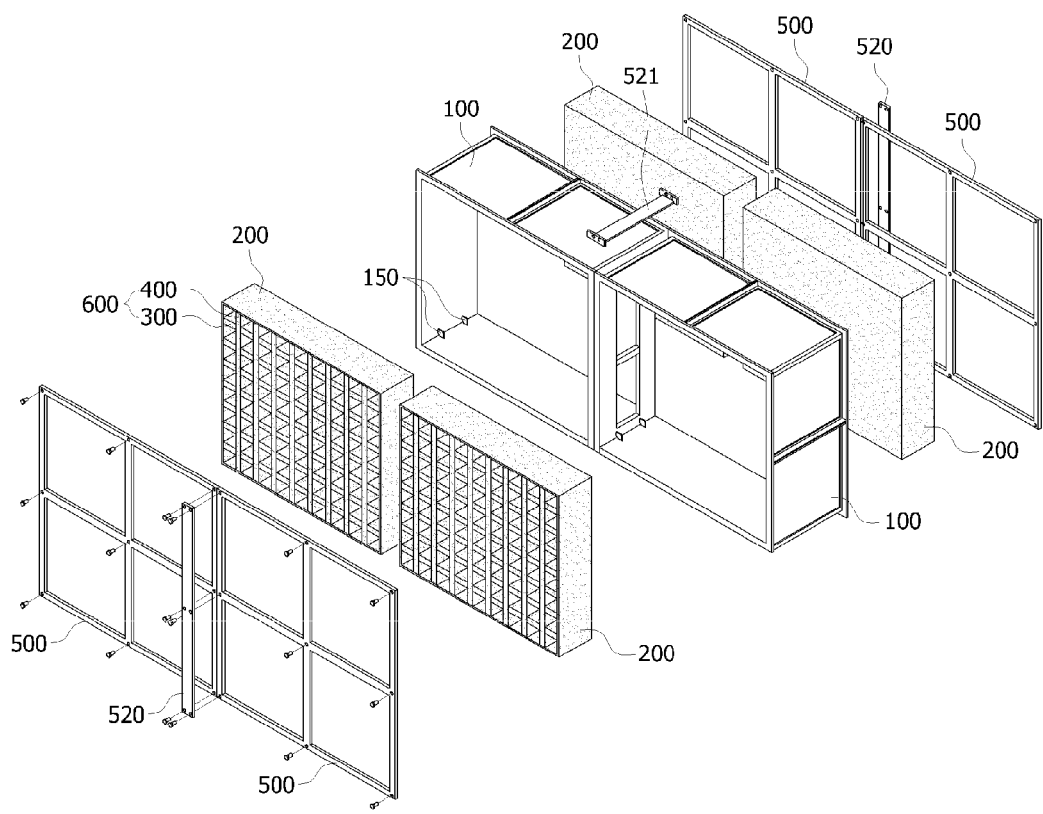
FIG. 23 is a perspective view of another embodiment of the present invention including a plurality of strainer wall structures.

Hereinafter, another embodiment of the present invention will be described. FIG. 23 is a perspective view of another embodiment of the present invention including a plurality of strainer wall structures.

As shown in FIG. 23, two strainer wall structures 10 are coupled by coupling members 520 and 521. In this embodiment, while the two strainer wall structures 10 are coupled, three or more strainer wall structures may be coupled according to embodiments.

The strainer wall structure 10 has the same constitution as described above. That is, the structure 10 includes a body 100 having fixing plates 150 disposed therein, two filter screens 210 inserted into the body 100, modular cassette apparatus 600 in which first and second filter plates 300 and 400 are assembled, and fixing frames 500. As shown in FIG. 23, the fixing frames 500 of the strainer wall structure 10 are coupled by first coupling members 520, and the first coupling members 520 are coupled by second coupling members 521 to couple the two strainer wall structures 10.

The above coupling method has been for illustrative purposes only, and other methods of coupling a plurality of strainer wall structures may fall into the scope of the present invention, not limited to the above embodiment.

The foregoing description concerns an exemplary embodiment of the invention, is intended to be illustrative, and should not be construed as limiting the invention. The present teachings can be readily applied to other types of devices and apparatus. Many alternatives, modifications, and variations within the scope and spirit of the present invention will be apparent to those skilled in the art.

The invention claimed is:

1. A filtration apparatus for an Emergency Core Cooling System of a nuclear power plant, the filtration apparatus comprising:
- a substantially rectangular body bounded by four non-welded closed surfaces that define an open volume, wherein the body includes
    - at least one outlet extending through at least one of the four closed surfaces, and
    - fixed plates mounted on interior surfaces of the rectangular body;
- punched plate filter screens mounted within the open volume of the body, wherein
    - the punched plate filter screens engage the fixed plates and define a discharge space within the open volume, and
    - the discharge space is bounded by the closed surfaces and the punched plate filter screens, and is in fluid communication with the outlet; and
- a modular cassette including
    - a first set of dual wall filtration plates having a first set of uniformly spaced grooves, and
    - a second set of dual wall filtration plates having a second set of uniformly spaced grooves, wherein
        - the first and second sets of uniformly spaced grooves orthogonally engage each other, without welding,
        - the first and second sets of dual wall filtration plates define a grid of hollow filtration elements and a continuous hollow interior volume within the grid of hollow filtration elements,
        - a first of the hollow filtration elements engages a first of the punched plate filter screens on a first side of the discharge space,
        - a second of the hollow filtration elements, which is substantially identical to the first of the hollow filtration elements, engages a second of the filter screens on a second side, opposite the first side, of the discharge space, so that
            - cooling water to be filtered flows into the open volume from two opposed sides of the discharge space,
            - a first portion of the cooling water flows through the first and second hollow filtration elements and then flows through the punched plate filter screens and into the discharge space,
            - a second portion of the cooling water flows only through the punched plate filter screens into the discharge space, and
            - the cooling water that has entered the discharge space flows out through the outlet.

* * * * *